United States Patent
Evans et al.

(10) Patent No.: US 9,124,663 B2
(45) Date of Patent: *Sep. 1, 2015

(54) BANDWIDTH SHARING IN A DISTRIBUTED WIRELESS CLIENT APPLICATION USING INVERSE MULTIPLEXING TERMINATION

(71) Applicant: Novara Technology, LLC, Wilmington, DE (US)

(72) Inventors: Gregory M. Evans, Raleigh, NC (US); Scott Curtis, Chapel Hill, NC (US); Sean T. Purdy, Durham, NC (US); Alfredo C. Issa, Apex, NC (US)

(73) Assignee: Novara Technology, LLC, Wilmington, DE (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/651,881

(22) Filed: Oct. 15, 2012

(65) Prior Publication Data

US 2013/0034042 A1 Feb. 7, 2013

Related U.S. Application Data

(63) Continuation of application No. 12/656,528, filed on Feb. 2, 2010, now Pat. No. 8,289,997.

(60) Provisional application No. 61/149,223, filed on Feb. 2, 2009.

(51) Int. Cl.
| | |
|---|---|
| *H04L 12/28* | (2006.01) |
| *H04L 29/06* | (2006.01) |
| *H04N 21/4363* | (2011.01) |
| *H04N 21/472* | (2011.01) |
| *H04N 21/63* | (2011.01) |
| *H04N 19/30* | (2014.01) |
| *H04J 1/16* | (2006.01) |

(52) U.S. Cl.
CPC .......... *H04L 65/4076* (2013.01); *H04L 65/607* (2013.01); *H04L 65/80* (2013.01); *H04N 19/30* (2014.11); *H04N 21/43637* (2013.01); *H04N 21/47202* (2013.01); *H04N 21/631* (2013.01); *H04N 21/632* (2013.01)

(58) Field of Classification Search
USPC ................................. 370/252, 329, 442, 535
See application file for complete search history.

(56) References Cited

U.S. PATENT DOCUMENTS

| | | |
|---|---|---|
| 5,541,919 A | 7/1996 | Yong et al. |
| 5,579,239 A | 11/1996 | Freeman et al. |
| 5,684,716 A | 11/1997 | Freeman |

(Continued)

OTHER PUBLICATIONS

"3GPP," Wikipedia, at <http://en.wikipedia.org/wiki/3GPP>, as revised Mar. 27, 2008, printed Dec. 12, 2011, 1 page.

(Continued)

*Primary Examiner* — John Pezzlo

(57) ABSTRACT

A system and method for bandwidth sharing in a distributed wireless client application using inverse multiplexing termination. The system includes: a group of collocated client playback devices having wide area network (WAN) and local area network (LAN) connectivity, and a centralized inverse multiplexing (IMUX) server which optimizes shared bandwidth of both the WAN via inverse multiplexing and the LAN using either broadcast or multicast of all virtual multiplexing paths to all other client playback devices of the group of collocated client playback devices. Other embodiments are disclosed.

24 Claims, 7 Drawing Sheets

(56) References Cited

U.S. PATENT DOCUMENTS

| | | | |
|---|---|---|---|
| 5,870,390 | A | 2/1999 | Campanella |
| 6,618,593 | B1 | 9/2003 | Drutman et al. |
| 7,461,126 | B2 | 12/2008 | Berkeland et al. |
| 7,590,145 | B2 * | 9/2009 | Futch et al. .............. 370/466 |
| 7,733,913 | B1 | 6/2010 | Cheung et al. |
| 8,289,997 | B2 | 10/2012 | Evans et al. |
| 2002/0095498 | A1 | 7/2002 | Chanda et al. |
| 2005/0063369 | A1 | 3/2005 | Choudhury et al. |
| 2005/0122978 | A1 * | 6/2005 | Nicholson .............. 370/395.1 |
| 2005/0243835 | A1 | 11/2005 | Sharma et al. |
| 2005/0283797 | A1 | 12/2005 | Eldering et al. |
| 2007/0204321 | A1 | 8/2007 | Shen et al. |
| 2008/0165701 | A1 | 7/2008 | Ananthanarayanan et al. |
| 2008/0298238 | A1 | 12/2008 | Dawson et al. |
| 2008/0301727 | A1 | 12/2008 | Cristofalo et al. |
| 2009/0044246 | A1 | 2/2009 | Sheehan et al. |
| 2009/0204966 | A1 | 8/2009 | Johnson et al. |
| 2010/0017261 | A1 | 1/2010 | Evans et al. |
| 2010/0027426 | A1 | 2/2010 | Nair et al. |
| 2012/0039309 | A1 | 2/2012 | Evans et al. |

OTHER PUBLICATIONS

"4G," Wikipedia, at <//en.wikipedia.org/wiki/4G>, as revised Apr. 23, 2008, printed Dec. 12, 2011, 1 page.

Ananthanarayanan et al., "COMBINE: Leveraging the Power of Wireless Peers through Collaborative Downloading", MobiSys '07, Jun. 11-14, 2007, San Juan, Puerto Rico, copyright 2007, ACM, 13 pages.

"Digital rights management," at <http://en.wikipedia.org/wiki/Digital_rights_management>, includes information dating back to 1998, page last modified Apr. 16, 2011, printed Apr. 21, 2011, 21 pages.

"Forward Error Correction," at <http://en.wikipedia.org/wiki/Forward_error_Correction>, contains information dated back to the 1950s, page last modified Apr. 4, 2011, printed Apr. 21, 2011, 6 pages.

Hu, H. et al., "2PASS: Bandwidth-Optimized Location Cloaking for Anonymous Location-Based Services," accepted for publication in IEEE Transactions on Parallel and Distributed Systems, copyright 2010, IEEE, found at <http://www.comp.hkbu.edu.hk/~xujl/Papers/tpds2010-2pass.pdf>, 15 pages.

"Inverse Multiplexing for ATM (IMA) Specification," Ver. 1.1, AF-PHY-0086.001, Mar. 1999, The ATM Forum, Technical Committee, copyright 1999, The ATM Forum, 185 pages.

"Inverse multiplexing for ATM (IMA)," Series I: Integrated Services Digital Network, B-ISDN equipment aspects—Multiplexing aspects, ITU-T 1.761, prepared by ITU-T Study Group 13 (1997-2000) and approved under the WTSC Resolution 1 procedure on Mar. 10, 2000, International Telecommunication Union, 10 pages.

"IPv6," Wikipedia, at <http://en.wikipedia.org/wiki/IPv6>, includes information that dates back to the early 1980s, page last modified Apr. 18, 2011, printed Apr. 21, 2011, 16 pages.

Kim, K.-H. and Shin, K, "PRISM: Improving the Performance of Inverse-Multiplexed TCP in Wireless Networks," IEEE Transactions on Mobile Computing, vol. 6, No. 12, Dec. 2007, IEEE, pp. 1297-1312.

"Location-based service," Wikipedia, at <http://en.wikipedia.org/w/index.php?title=Location-based_service&oldid=251090331>, as revised Nov. 11, 2008, printed Dec. 13, 2011, 4 pages.

"Multicast," Wikipedia, at <http://en.wikipedia.org/wiki/Multicast>, includes information that dates back to 2005, page last modified Mar. 26, 2011, printed Apr. 21, 2011, 5 pages.

Oliver, Mark, "Tutorial: The H.264 Scalable Video Codec (SVC)," EE Times, Mar. 10, 2008, at <http://www.eetimes.com/design/signal-processing-dsp/4017613/Tutorial-The-H-264-Scalable-Video-Codec-SVC->, printed May 25, 2011, 7 pages.

Wiegand, T. et al., "Overview of the H.264/AVC Video Coding Standard," IEEE Transactions on Circuits and Systems for Video Technology, vol. 13, No. 7, Jul. 2003, IEEE, pp. 560-576, 17 pages.

"WiMAX," Wikipedia, at <http://en.wikipedia.org/w/index.php?title=WiMAX&oldid=255645067>, as revised Dec. 3, 2008, printed Dec. 13, 2011, 15 pages.

* cited by examiner

BANDWIDTH SHARING IN A DISTRIBUTED WIRELESS CLIENT APPLICATION USING INVERSE MULTIPLEXING TERMINATION

CROSS REFERENCE TO RELATED APPLICATIONS

The present application is a continuation of U.S. application Ser. No. 12/656,528, filed Feb. 2, 2012, which claims priority from U.S. Provisional Application No. 61/149,223 filed on Feb. 2, 2009, the disclosures of which are hereby incorporated herein by reference in their entireties.

FIELD OF THE INVENTION

The present invention relates generally to communication systems and, more particularly, to bandwidth sharing in distributed applications.

BACKGROUND OF THE INVENTION

Emerging 4G mobile networks including Worldwide Interoperability for Microwave Access (WiMAX) and Long Term Evolution (LTE) will offer widespread wireless broadband access opening many new opportunities for unique social networking and location-based services. However, new applications may require additional bandwidth beyond the capabilities of a single subscriber's 3G, 4G, or even Wireless Fidelity (WiFi)-to-wireless wide area network (WAN) connection. However, present solutions do not offer efficient and/or reliable means to accomplish this bandwidth sharing.

Inverse multiplexing is the reciprocal of a traditional multiplexer/de-multiplexer combination where many smaller sessions or circuits share a common and much larger bandwidth session or circuit. An inverse multiplexer allows a larger session or circuit to be transported over several smaller sessions or circuits and then recombine the smaller sessions to the original larger session at the inverse multiplexing termination. Inverse multiplexing has been used primarily in asynchronous transfer mode (ATM) transport where telephone companies wish to share existing parallel T1 circuits (1.544 Mb/s each) in a common multi-pair cable to save cost versus replacing the cable with fiber for higher bandwidth sessions than 1.544 Mb/s.

FIG. 6 is a basic diagram from Xilinx White Paper #107, published on Jan. 11, 2000, and shows a simplified high bandwidth flow of ATM cells transported over multiple physical layer links. The above-described inverse multiplexing implementation is fully defined in the following ATM Forum and International Telecommunication Union (ITU) standards documents: AF-PHY-0086.001, Inverse Multiplexing for ATM (IMA) Specification, Ver. 1.1, April 1999, and ITU-T I.761 Inverse multiplexing for ATM (IMA), which are incorporated herein by reference.

Moreover, scalable video coding was recently implemented within the MPEG-4/Part-10 and H.264 standards bodies. Scalable video coding allows for efficient one time compression of video content suitable for multiple quality levels of playback requiring the given client device to only receive the needed bandwidth for the playback client. This is accomplished by generating multiple layers during the video compression process. A basic diagram showing how enhancement layers are provided to a base layer in H.264 scalable video coding is shown in FIG. 7.

A base layer (or stream) provides minimum bandwidth support for playback (i.e., the lowest quality level, frame rate, and resolution) needed by any client. Clients with higher level playback capabilities may select to receive one or more enhancement layers increasing quality, frame rate, and/or resolution. A more complete description of H.264 scalable video coding can be found in the following white paper: "Overview of the H.264/AVC Video Coding Standard," Thomas Wiegand, Gary J. Sullivan, Senior Member, IEEE, Gisle Bjøntegaard, and Ajay Luthra, Senior Member, IEEE paper, which is incorporate herein by reference.

Scalable video coding and inverse multiplexing per se are both understood in the related art as independent technologies solving their own unique problem sets. However, there has been no understanding of how to integrate these concepts together to provide higher quality video delivery to co-located client devices utilizing independent carrier networks.

SUMMARY OF THE INVENTION

The present invention relates to systems and methods for allowing co-located wireless wide area network (WAN) clients to efficiently and reliably share Internet Protocol (IP) bandwidth for video applications requiring streaming rates in excess of an individual user's WAN access bandwidth.

Systems and methods consistent with the present invention provide scalable video coding over an inverse multiplexing protocol with a local area network (LAN) or a personal area network (PAN) based multicast redistribution to co-located clients for final termination of the protocol.

By using co-located mobile subscribers to form bandwidth sharing networks, systems and methods consistent with the present invention are operative to boost IP bandwidth for video distribution. Additionally, a network consistent with the present invention operates over multiple carrier systems simultaneously and transparently to the user.

According to one aspect, the present invention provides a method of bandwidth sharing in a distributed wireless client application, including: establishing a unicast connection with each of a plurality of client devices having wide area network (WAN) and local area network (LAN) connectivity; establishing a LAN between the plurality of client devices; beginning an inverse Multiplexed session with each of the plurality of client devices within the LAN; streaming in a unicast format via the inverse multiplexed session over a multi-transport path terminating at each of the client devices, wherein each of the client devices receives its unicast and then retransmits over the LAN, such that each of the client devices receives all unicast sessions of all of the other client devices; and terminating the inverse multiplexed session into a streamed media.

In the method, the streamed media may comprise a scalable video coded stream.

According to another aspect of the present invention, a system for bandwidth sharing in a distributed wireless client application, includes: means for establishing a unicast connection with each one of a group of client playback devices having wide area network (WAN) connectivity and local area network (LAN) connectivity; means for establishing a LAN between the client playback devices; means for starting an inverse multiplexed session with respect to each of the client playback devices within the LAN; means for streaming via the inverse multiplexed session all video layers that can be carried, wherein each of the client playback devices receives its unicast and then one of rebroadcasts or multicasts over the LAN, such that each of the client playback devices receives all unicast sessions of all of the other client playback devices; and means for terminating the inverse multiplexed session into a single video for the entire group of client playback devices.

The single video content may comprise compressed video content that has been layered using scalable video coding.

The present invention also contemplates a computer readable medium including a program for instructing a wireless client device to: receive from a wireless wide area network (WAN) one or more logical channels of a multiple channel inverse multiplexed session; re-transmit the received logical channels for multicast delivery over a local area network (LAN) or a personal area network (PAN) for the inverse multiplexed session; receive from the LAN or the PAN additional inverse multiplexed logical channels associated with the inverse multiplexed session from other wireless client devices; terminate the inverse multiplexed session for the wireless client device per defined inverse multiplexed protocol into a media stream; and playback available multimedia layers on the media stream based on at least one of bandwidth received using inverse multiplexing and playback capabilities of the wireless client device.

The present invention also provides a computer readable medium including a program for instructing a centralized inverse multiplexing (IMUX) server to: provide a single video to a group of collocated client playback devices; and optimize shared bandwidth of both a wide area network (WAN) via inverse multiplexing and a local area network (LAN) using broadcast or multicast of all virtual multiplexing paths to all other client playback devices of the group of client playback devices.

The computer readable medium further comprises a program for instructing a centralized IMUX server to use scalable video coding to obtain layering of content quality above an inverse multiplexed layer, and thereby optimize video quality to each client playback device having different playback and display capabilities.

The LAN may comprise a wireless localized ad hoc LAN.

The present invention also provides a computer readable medium including a program for instructing a centralized inverse multiplexing server to: establish a unicast connection with each of a plurality of client devices having wide area network (WAN) and local area network (LAN) connectivity; establish a LAN between the plurality of client devices; begin an inverse multiplexed session with each of the plurality of client devices within the a LAN; stream in a unicast format via the inverse multiplexed session over a multi-transport path terminating at each of the client devices, wherein each of the client devices receives its unicast and then retransmits over the a LAN, such that each of the client devices receives all unicast sessions of all of the other client devices; and terminate the inverse multiplexed session into a streamed media.

The present invention also provides a system for bandwidth sharing in a distributed wireless client application, including: a group of collocated client playback devices having wide area network (WAN) and local area network (LAN) connectivity; and a centralized inverse multiplexing (IMUX) server which optimizes shared bandwidth of both the WAN via inverse multiplexing and the LAN using either broadcast or multicast of all virtual multiplexing paths to all other client playback devices of the group of collocated client playback devices.

The LAN may comprise a wireless localized ad hoc LAN.

The present invention also provides a method operating in a wireless client device, including: receiving from a wireless wide area network (WAN) one or more logical channels of a multiple channel inverse multiplexed session; re-transmitting the received logical channels for multicast delivery over a local area network (LAN) or a personal area network (PAN) for the inverse multiplexed session; receiving from the LAN or the PAN additional inverse multiplexed logical channels associated with the inverse multiplexed session from other wireless client devices; terminating the inverse multiplexed session for the wireless client device per defined inverse multiplexed protocol into a media stream; and playing back available multimedia layers on the media stream based on at least one of bandwidth received using inverse multiplexing and playback capabilities of the wireless client device.

The present invention also provides a wireless client device including a controller to: receive from a wireless wide area network (WAN) one or more logical channels of a multiple channel inverse multiplexed session; re-transmit the received logical channels for multicast delivery over a local area network (LAN) or a personal area network (PAN) for the inverse multiplexed session; receive from the LAN or the PAN additional inverse multiplexed logical channels associated with the inverse multiplexed session from other wireless client devices; terminate the inverse multiplexed session for the wireless client device per defined inverse multiplexed protocol into a media stream; and play back available multimedia layers on the media stream based on at least one of bandwidth received using inverse multiplexing and playback capabilities of the wireless client device.

The present invention also provides a server including a controller to: establish a unicast connection with each of a plurality of client devices having wide area network (WAN) and local area network (LAN) connectivity; establish a LAN between the plurality of client devices; begin an inverse multiplexed session with each of the plurality of client devices within the LAN; stream in a unicast format via the inverse multiplexed session over a multi-transport path terminating at each of the client devices, wherein each of the client devices receives its unicast and then retransmits over the LAN, such that each of the client devices receives all unicast sessions of all of the other client devices; and terminate the inverse multiplexed session into a streamed media.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
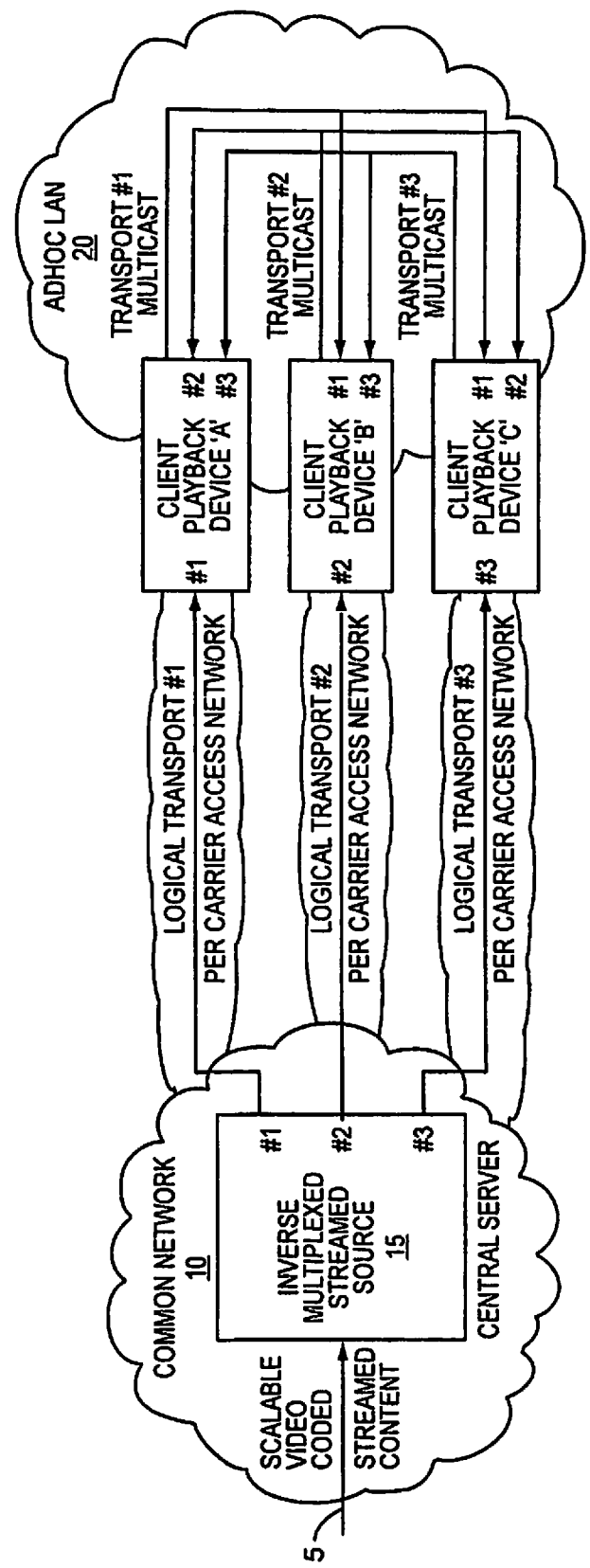
FIG. 1 illustrates a top level system overview according to an exemplary embodiment of the present invention.

The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Note that at times the system of the present invention is described as performing a certain function. However, one of ordinary skill in the art would know that the program is what is performing the function rather than the entity of the system itself. Further, embodiments of the present invention can be implemented in hardware, software, or a combination thereof.

Although aspects of one implementation of the present invention are depicted as being stored in memory, one skilled in the art will appreciate that all or part of systems and methods consistent with the present invention may be stored on or read from other computer-readable media, such as secondary storage devices, like hard disks, floppy disks, and CD-ROM, or other forms of a read-only memory (ROM) or a random access memory (RAM) either currently known or later developed. Further, although specific components of the system have been described, one skilled in the art will appreciate that a system suitable for use with the methods and systems consistent with the present invention may contain additional or different components.

As will be discussed in more detail below with reference to the drawing figures, the present invention relates to a distributed client functionality allowing localized users to leverage each other's WAN bandwidth via standardized inverse multiplexing protocols. The present invention also provides for improved transport of multimedia such as a scalable video coded stream as defined in the H.264 video compression standard. Implementation may be carried out utilizing a centralized server which receives (via a stream) or accesses (via storage) scalable video coded (i.e., compressed) content and streams in a unicast format to a group of client devices. The transmitted stream is provided over a multi-transport path terminating independently at each of the clients. To complete connectivity of all logical transport channels to all client devices, each client device retransmits its WAN received logical channel to each of the other client devices over a LAN. The LAN can be an ad hoc LAN (e.g., a wireless localized ad hoc LAN). Preferably, but not necessarily, the retransmission is multicast if performed at Layer-3 (IP routing) or broadcast if performed at Layer-2 (Media Access Control (MAC) switched). Finally, each, of the client devices terminates the inverse multiplexed session to receive the video content and then be decompressed for playback. The available LAN bandwidth is greater than the sum of the client WAN bandwidths.

FIG. 1 illustrates an exemplary three client solution. In a common network 10, such as but not limited to, a wireless WAN network, a central, inverse multiplexing (IMUX) server 15 receives compressed video content 5 that has been layered using scalable video coding. The compressed video content 5 may come from an existing multicast or a dedicated unicast from a streaming server. The streaming server may be co-located with or remote from the inverse multiplexing server 15. The received content 5 may also be read from storage (local or remote) and then streamed. The received content 5 is segmented and transported in a round-robin fashion over multiple logical transport channels 1, 2, and 3 to each of the clients or also referred to as client devices or client playback devices A, B, and C. A more detailed discussion on inverse multiplexing transmission per se is set forth above in the Background of the Invention section. Each of the client devices A, B, and C then receives and retransmits its received WAN channel to other clients on an ad hoc LAN 20. Each of the client devices A, B, and C then has access to all logical transport channels 1, 2, and 3 to terminate the inverse multiplexing session and access the higher bandwidth content.

Figure 2:
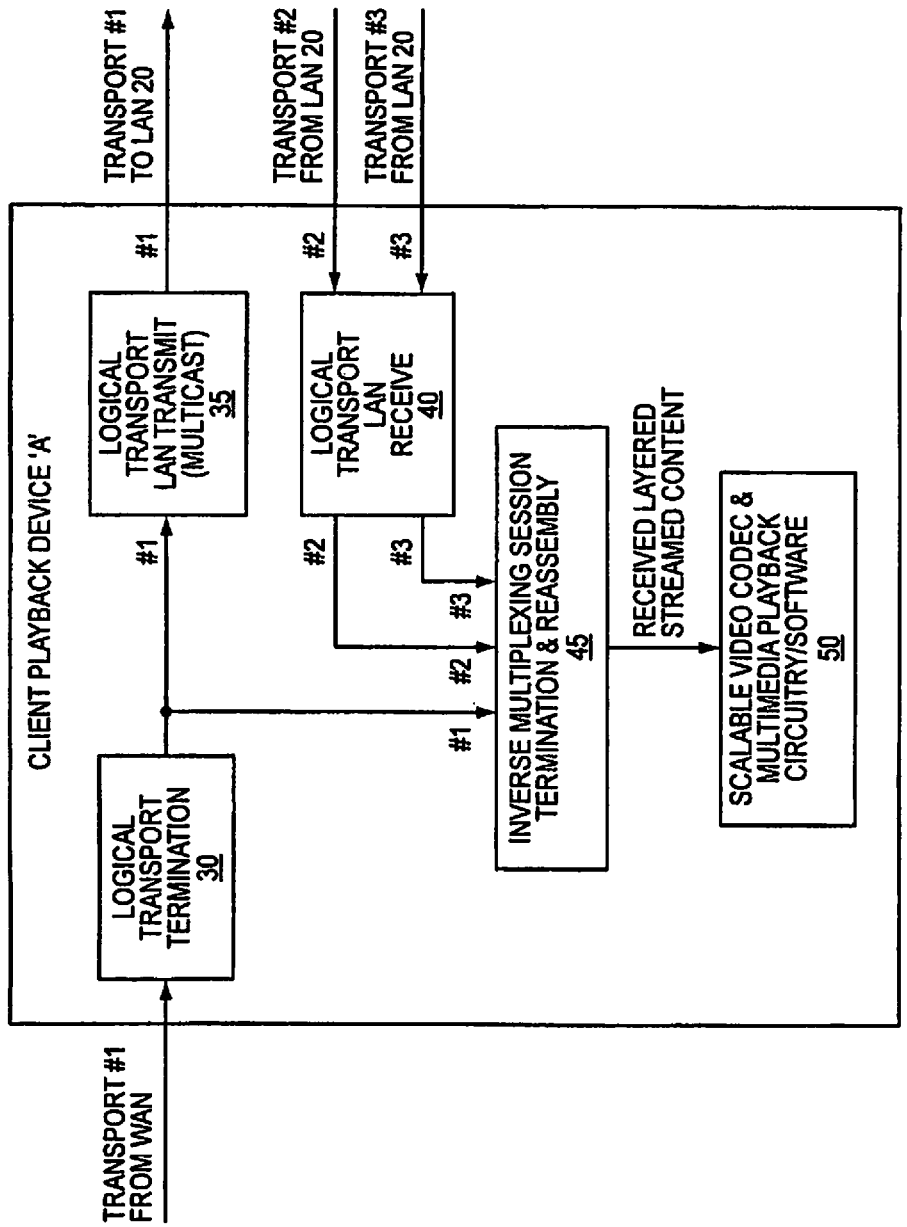
FIG. 2 illustrates a block diagram of the basic client playback device from FIG. 1 according to an illustrative embodiment.

FIG. 2 illustrates a block diagram of the basic client playback device from FIG. 1 according to an illustrative embodiment of the present invention. In particular, more details on the basic client functions are set forth in connection with FIG. 2, where client playback device A from FIG. 1 is described in an exemplary embodiment.

The logical transport termination 30 receives the logical transport channel #1 directly or indirectly from, for example, a WAN based connection. The WAN port may be a carrier's wireless interface including (but not limited to) 2G, 3G, or 4G, (WiMAX, LTE, etc). Additionally the wireless interface could be a WiFi (IEEE 802.11.x) access point connected to the Internet via a cable modem, digital subscriber line (DSL), or other fixed line broadband access. The received channel #1 is then retransmitted (in a multicast or broadcast fashion) at logical transport LAN transmit (multicast) 35 over the ad hoc LAN 20 connecting to the other clients. The LAN connection may be an access point (e.g., a WiFi access point) based LAN (versus ad hoc); however, the bandwidth savings of multicast or broadcast may be less in that scenario.

The client playback device A also receives at logical transport LAN receive 40 via the LAN 20 all other logical channels (e.g., #2 and #3) associated with a given inverse multiplexed group. The WAN and the LAN channels #1, #2, and #3 are then presented to a inverse multiplexing termination session and re-assembly 45. At this point, all content received is ordered to correct for any deltas in network delays and presented to a standard codec and playback function 50 suitable for scalable video coded content.

The receive WAN function at logical transport termination 30 of the client playback device A may also do buffering and monitoring of the WAN transport link in conjunction with the central IMUX server 15. The receive WAN function may ACK (acknowledge) received packets and/or request retransmission of dropped packets dependent on the inverse multiplexing protocol used. Additionally, this function may need to be implemented between the transmit and receive functions on the LAN 20 side. The protocol may allow independent transport monitoring and retransmission on WAN and LAN links implying overall complexity. An alternative embodiment may include a robust Forward Error Correction (FEC) to minimize data (i.e., content) loss. With FEC, no ACKs or retransmit requests are necessary. However, a bandwidth penalty (i.e., overhead) may be incurred to carry the redundant information.

Alternately, some clients may only receive LAN logical transport circuits thus piggy-backing on the WAN connected clients to receive their streamed content. Digital Rights Management (DRM) technology may also control/restrict access to the content based on content owner rights, or be used to provide security to participating clients over the ad hoc LAN 20 as they share data. This would be useful in a multi-session arrangement where some WAN connected clients would only be retransmitting the content as a service to the other clients.

The system is also well suited using an inverse multiplexed protocol to dynamically add or drop client devices per users requesting on and off the system. The protocol can also respond to changing bandwidth capabilities of the WAN or LAN by sub-dividing the single logical WAN channel into multiple channels for a given device. The inverse multiplexing protocol then responds to availability of these channels.

As an alternate embodiment, the system may work in conjunction with the system of application Ser. No. 12/174,854, filed on Jul. 17, 2008, entitled "Expert System and Service for Location-Based Content Influence for Narrowcast" the disclosure of which is incorporated herein by reference, where collocated users matching to relevant content sharing are identified to lower wireless bandwidth usage in a given area.

Figure 3A:
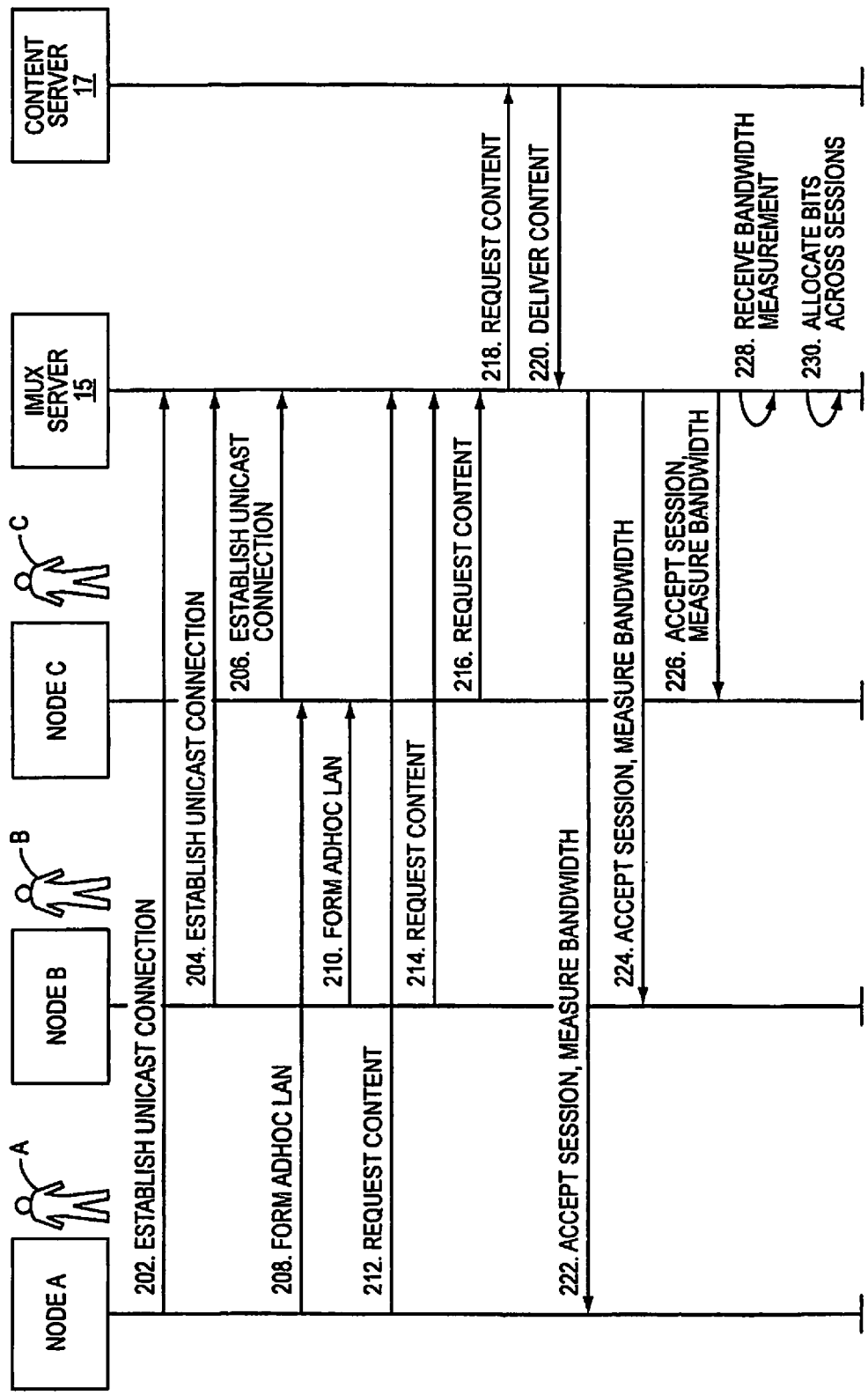
FIGS. 3A and 3B illustrate the setup, operation, and tear down of the inverse multiplexing network circuit of the systems shown in FIGS. 1 and 2.
Figure 3B:
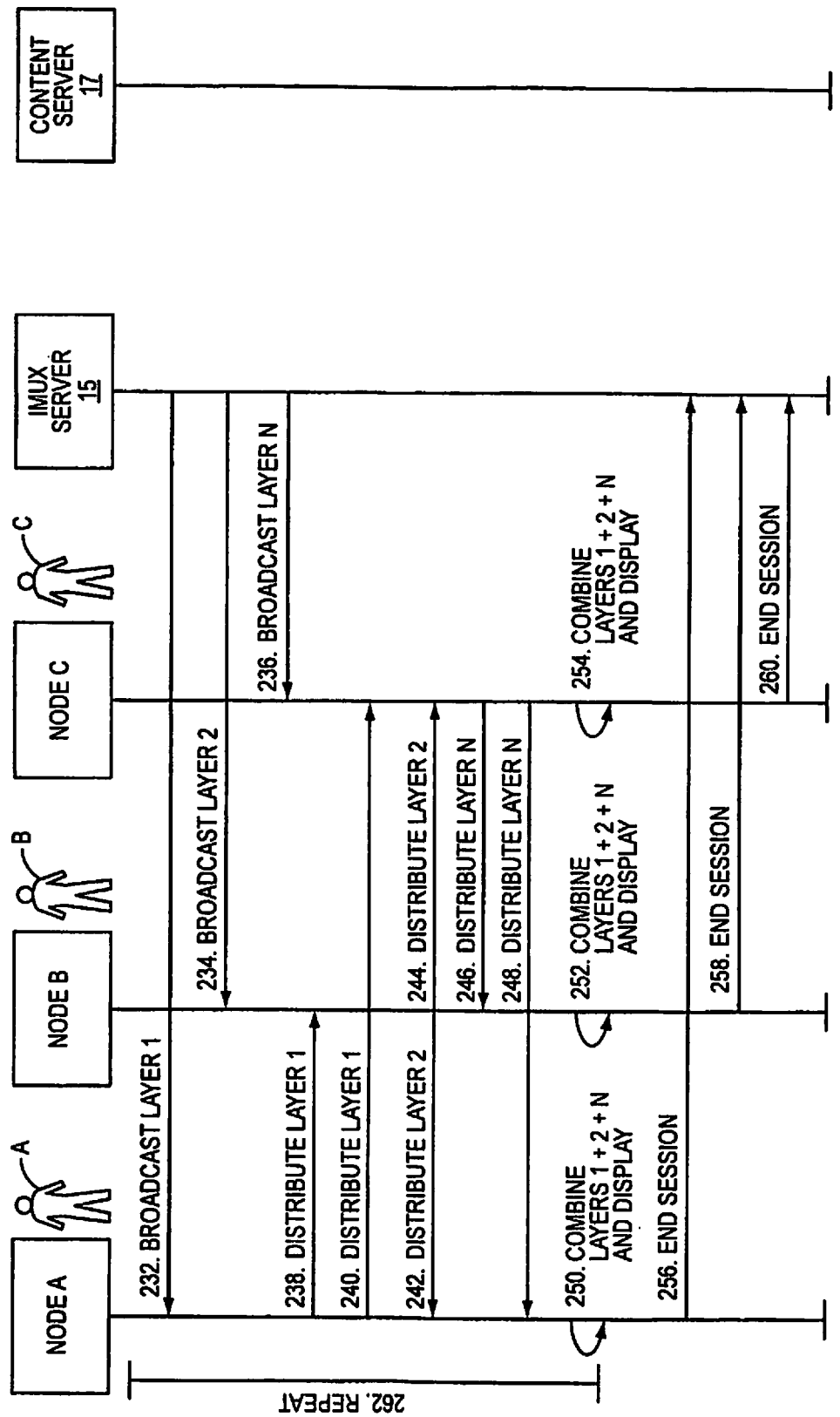

FIGS. 3A and 3B illustrate the setup, operation, and tear down of the inverse multiplexing network circuit of the systems shown in FIGS. 1 and 2. The process begins with a number of client devices A, B, C establishing a unicast connection with the IMUX Server 15 for the purpose of requesting content (steps 202, 204, 206) over a WAN.

Upon successful connection with the IMUX Server 15, the client devices A, B, C, communicate with one another to form an ad hoc network 20 (steps 208, 210). Once the ad hoc network is established, each of the client devices A, B, C, requests the same content selection from the IMUX server 15 (steps 212, 214, 216). The IMUX Server 15 subsequently requests the content (step 218) from the Content Server 17, and receives a reference to the content suitable for streaming (step 220).

Once the content selection has been secured (steps 218, 220), the IMUX Server 15 accepts the session connection requests (steps 222, 224, 226) from the client devices A, B, C, and proceeds to measure the available bandwidth between each respective client device and the IMUX Server 15 (step 228) over the unicast connection. Network characteristics such as bandwidth, latency, maximum packet size, and the like are determined. Based on the information determined in this measurement step 228, the IMUX Server 15 allocates a sub portion of the content payload to send over each unicast connection at step 230.

In one embodiment of the present disclosure, the content payload is allocated by taking a version of the content selection that has been encoded using the layered scalable video coding format (SVC), and transmitting a different layer over each of the available unicast connections (steps 232, 234, 236). Once the various layers have been received at each of the client devices A, B, C, the client devices A, B, C, communicate with one another over the ad hoc network 20 to redistribute each layer to each of the respective other client devices (steps 238, 240, 242, 244, 246, 248). Once each client device A, B, C, has each of the needed SVC layers, the layers are recombined to reconstitute a locally playable segment of the content selection, and the content is displayed on the client device A, B, C, (steps 250, 252, 254).

Once all of the bits in a given layer of the SVC encoded content have been transmitted to the corresponding client device, the session is terminated (steps 256, 258, 260). Steps 232 through 254 may be repeated as at step 262 as each respective layer of the SVC encoded content is broken into smaller segments for real-time transmission.

Note that the above is an exemplary embodiment, and alternative embodiments combining various aspects of those described above may be possible. For example, it will be understood by those skilled in the art that devices may be added to or be removed from the inverse multiplexing session using standardized inverse multiplexing protocols as discussed in the Background of the Invention section. Moreover, it should be understood that more or less steps may be included. Additionally, the SVC encoded content of FIGS. 3A and 3B was segmented into three layers. It will be understood by those of skill in the art that some different number of layers could be chosen. In addition, it is possible that some layers of the SVC encoded material may be streamed to more than one node when bandwidth is available. In one embodiment, the base layer is streamed to each of the client devices in addition to a unique SVC layer. This would enable each client device to be able to at least view the lowest quality version of the content selection, in the event of poor LAN performance, for example.

Figure 3C:
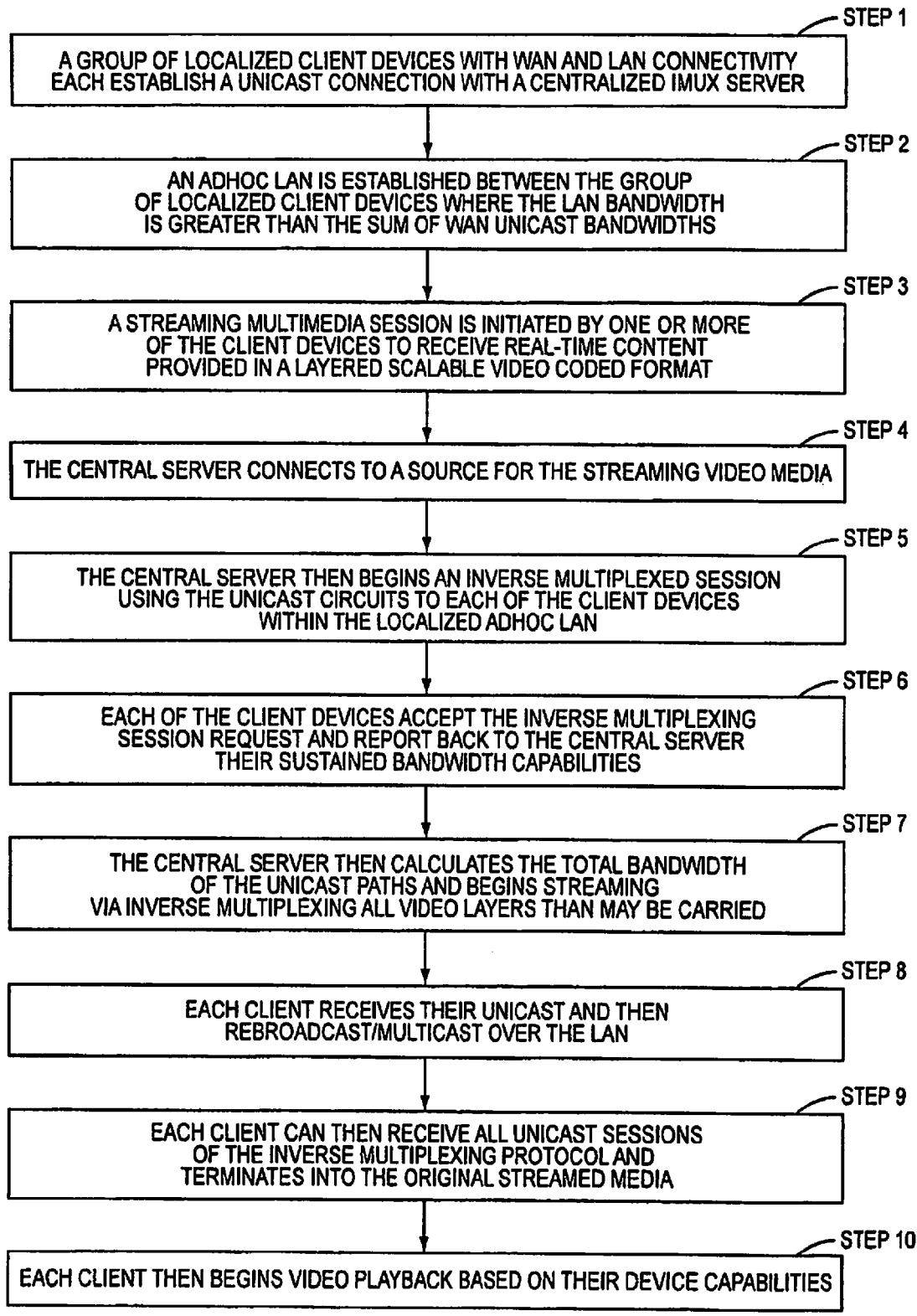
FIG. 3C depicts an illustrative embodiment of a method of inverse multiplexing initiation operating in the system of FIGS. 1 and 2.

FIG. 3C depicts an illustrative embodiment of a method of inverse multiplexing initiation operating in the system of FIGS. 1 and 2. It will be understood by those skilled in the art that devices may be added to or be removed from the inverse multiplexing session using standardized inverse multiplexing protocols as discussed in the Background of the Invention section. Moreover, it should be understood that more or less steps may be included.

As shown in FIG. 3C, consistent with the method according to the present invention, in step 1, a group of localized client devices (e.g., A, B, and C in FIG. 1) with WAN and LAN connectivity each establish a unicast connection with the centralized IMUX server 15. In step 2, an ad hoc LAN 20 is established between the group of localized client devices A, B, and C where the LAN bandwidth is greater than the sum of WAN unicast bandwidths. In step 3, a streaming multimedia session is initiated by one or more of the client devices A-C to receive real-time content provided in a layered scalable video coded format. In step 4, the central IMUX server 15 connects to a source for the streaming video media. In step 5, the central IMUX server 15 then begins an inverse multiplexed session using the unicast circuits to each of the client devices A, B, C, etc., within the localized ad hoc LAN 20. In step 6, each of the client devices accepts the inverse multiplexing session request and reports back to the central IMUX server 15 its sustained bandwidth capabilities. The central IMUX server 15 then calculates the total bandwidth of the unicast paths and begins streaming via inverse multiplexing all video layers that may be carried (see step 7). In step 8, each client A-C receives its unicast and then rebroadcasts/multicasts over the LAN 20. In step 9, each client A-C can then receive all unicast sessions of the inverse multiplexing protocol and terminate into the original streamed media. Finally, in step 10, each client device A-C then begins video playback based on its particular device capabilities.

Figure 4:
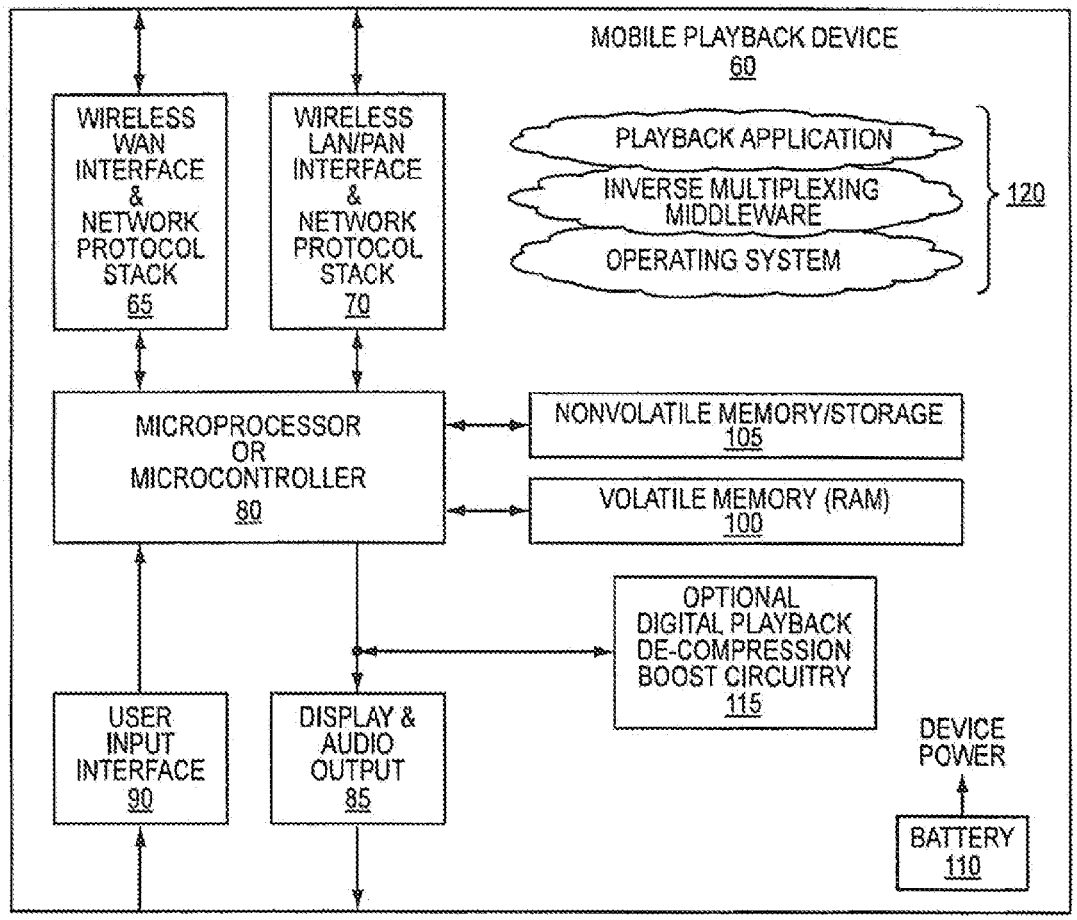
FIG. 4 illustrates the client device platform components according to an illustrative embodiment.

An exemplary client platform consistent with the present invention is shown in FIG. 4. The client device may be a laptop computer, a smart phone, or other combinations of client wireless devices. As an example, FIG. 4 shows a mobile playback device 60. The mobile playback device 60 includes both a wireless WAN port or interface 65 for connectivity to the centralized IMUX server 15 and a wireless LAN or PAN interface 70 for connection to other client devices within a localized vicinity. Other components are inclusive of standardized functions such as a microprocessor 80 (and associated circuitry), a display (e.g., a liquid crystal display (LCD) screen) and audio output (e.g., speakers, headphone jack, etc.) as at 85, user input interface 90 (e.g., keyboard, touch screen, mouse-pad, etc.), a volatile memory 100 (e.g., RAM), a non-volatile memory 105 (e.g., hard-drive, FLASH, etc.), and a battery 110. As shown at 115, optional circuitry may include hardware support for playback and decompression of digital file formats. As shown at 120, an embedded operating system (OS) would supply support for inverse multiplexing middleware and playback applications. The OS would also support the network protocol stack and interfaces to the WAN and the LAN/PAN networks.

Example

Figure 5:
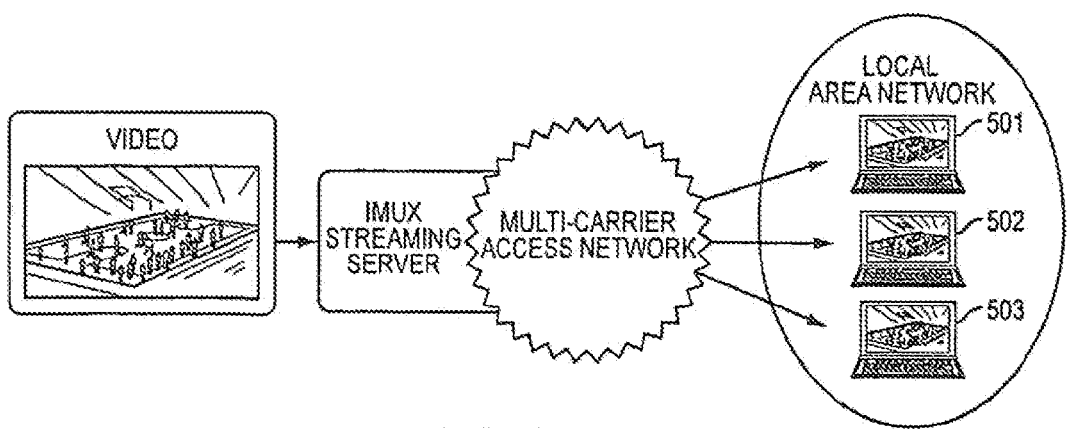
FIG. 5 depicts an example of the operation of the present invention according to an illustrative embodiment.
Figure 6:
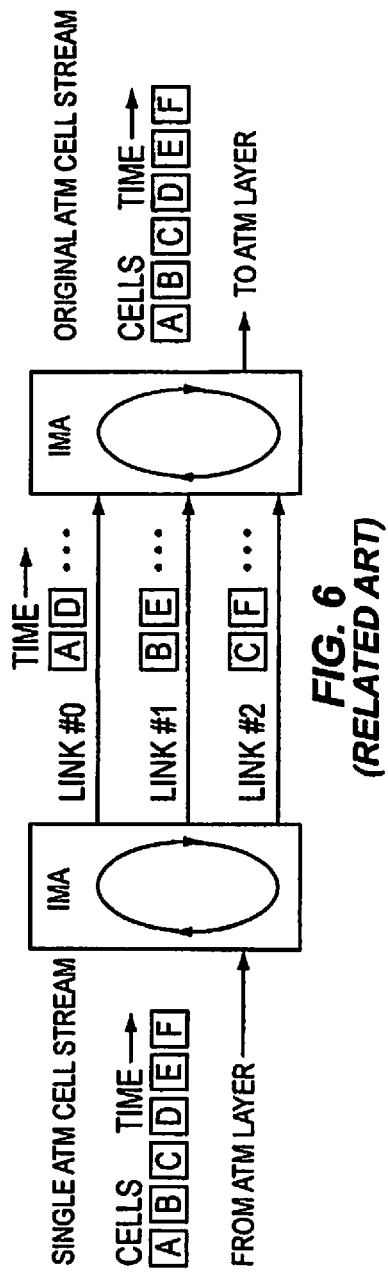
FIG. 6 illustrates a basic diagram of ATM cells over multiple physical layer links according to the related art.
Figure 7:
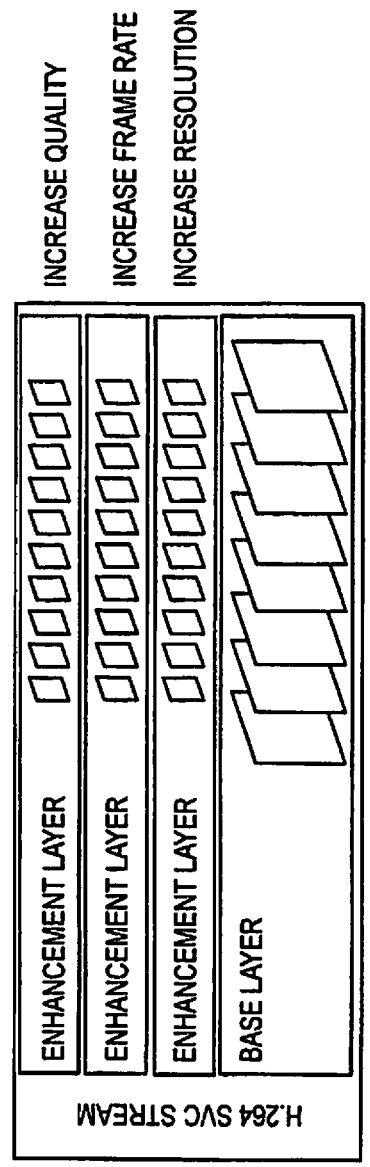
FIG. 7 illustrates a basic diagram of layers for scalable video coding according to the related art.

As shown in FIG. 5, a group of unacquainted passengers with laptops (and LAN connectivity to each other) are waiting at a gate in an airport will each watch the same live sporting event (e.g., North Carolina State vs. Duke basketball game) represented by the Video in FIG. 5 individually on their client laptops 501, 502 and 503. The game is made available in a high definition format using the H.264 scalable video format such that layered streams allowing each of the passengers to receive a quality level capable of both their combined bandwidth availability and individual client device playback capability. The streams are delivered as a single high bandwidth (multi-layer) stream using an inverse multiplexing protocol and individual transport links over different carrier WANs to each of the client laptops 501, 502 and 503 and there transmitted to each of the other clients using multicast over the LAN.

More specifically, the Example proceeds as follows: 1) The localized passengers with appropriate client devices are requested to log into a central server such as central IMUX server 15 where they will share bandwidth from each other's networks for an enhanced multimedia experience. 2) The client devices then initiate an ad hoc LAN using WiFi or other appropriate high-bandwidth interconnectivity. 3) The stated basketball viewing session is initiated when one of the passengers requests to the central IMUX server 15 to receive the basketball game in a high definition format. 4) The central IMUX server 15 connects via unicast or to an existing multicast stream provided in a H.264 layered scalable video coded compressed format of the requested basketball game. 5) The central IMUX server 15 then initiates an inverse multiplexed sourcing session with all available clients logged into the central IMUX server 15 within range of the client requesting the basketball game. 6) Client devices accept the session requests and qualify their sustained bandwidth capabilities back to the central IMUX server 15. 7) The central IMUX server 15 then calculates the total available bandwidth of the inverse multiplexed paths, and begins streaming the base H.264 layer and all enhancement layers that the combined path can support (see the Background of the Invention section for more details on scalable video coding layers). 8) Each client begins receiving their logical transport path over its carrier's WAN and retransmitting using a Layer-3 route multicast protocol or Layer-2 MAC broadcast to the other participating clients. 9) Each client begins receiving the additional LAN provided inverse multiplexed transport paths with its received WAN path and terminates the protocol into a single high-bandwidth H.264 scalable video format stream. 10) Each client then plays back its H.264 video stream according to the capability of its particular client playback device (i.e., screen size, central processing unit (CPU) power, battery usage, etc.).

Additionally, the H.264 layers may be added or deleted by the central IMUX server 15 based on additional clients joining or leaving the session. Multiple inverse multiplexed sessions may also be initiated provided bandwidth is available. For example, a group of twenty passengers may be watching three separate sporting events (five passengers watching Game #1, eight passengers watching Game #2, and seven passengers watching Game #3). However, each of the three game inverse multiplexed sessions would use all twenty passengers client devices for transport links. Digital rights management (DRM) would also be used to allow only authorized clients to see each of the games.

The present invention has substantial opportunity for variation without departing from the spirit or scope of the present invention. For example, the implementation of the present invention may be used in conjunction with other concepts to utilize a bandwidth sharing service. These features would include (but are not limited to) the following anatomized functions:

1) Identification of co-located devices capable of bandwidth sharing;
2) Per device historical and current usage of WAN based resources;
3) Availability of LAN based on possible bandwidth sharing devices;
4) Presence based data based on availability of sharing a video stream;
5) Profile or preference data for selection of a video or type of video; and
6) Probability of being within LAN connectivity per availability of video.

Additionally, the present invention could provide a service where common content needs to be distributed to all or a subset of a defined crowd. The common content would go beyond sharing of video, and more towards distribution of current data (stats and profile) for the crowd and other information relevant to the service.

Those skilled in the art will recognize improvements and modifications to the preferred embodiments of the present invention. All such improvements and modifications are considered within the scope of the concepts disclosed herein and the claims that follow.

The invention claimed is:

1. A server comprising:
a controller configured to:
establish a unicast connection with each of a plurality of client devices having a wide area network (WAN) and a local area network (LAN) connectivity;
receive streaming media content from a content server;
initiate an inverse multiplexed session with each of the plurality of client devices via their respective unicast connections; and
stream the media content via the inverse multiplex session over a multi-transport path terminating at each of the client devices to enable each of the client devices to re-transmit the content of its unicast connection over the LAN such that each of the client devices receives the content of the unicast connections of all of the other client devices.

2. The server of claim 1 wherein the LAN comprises a wireless localized ad hoc LAN.

3. The server of claim 1 wherein the streamed media content comprises a scalable video coded stream.

4. The server of claim 3 wherein playback of the scalable video coded stream is enabled based on at least one of a plurality of bandwidths received using inverse multiplexing and playback capabilities of each of the client devices.

5. The server of claim 4 wherein the playback capabilities of each of the client devices comprise one or more of a screen size, central processing unit (CPU) power, and battery usage.

6. The server of claim 3 wherein the streamed media content includes digital rights management (DRM) that allows only authorized client devices access to the scalable video coded stream.

7. The server of claim 1 wherein a bandwidth of the LAN is greater than a sum of WAN unicast bandwidths.

8. The server of claim 1 wherein the streamed media content comprises a single high-bandwidth H.264 scalable video format stream.

9. The server of claim 8 wherein additional H.264 layers may be added or deleted based on additional client devices joining or leaving the inverse multiplexed session.

10. The server of claim 1 wherein re-transmitting over the LAN uses a Layer-Media 2 Access Control (MAC) broadcast to the other client devices of the plurality of client devices.

11. The server of claim 1 wherein re-transmitting over the LAN uses a Layer-3 route multicast protocol to the other client devices of the plurality of client devices.

12. A wireless client device comprising:
a controller configured to:
receive, from a wireless wide area network (WAN), content from one or more logical channels of a multiple channel inverse multiplexed session;
re-transmit the received content over a local area network (LAN) or a personal area network (PAN) to other wireless client devices;
receive, from the LAN or the PAN, content from one or more logical channels associated with the other wireless client devices in the inverse multiplexed session;
terminate the inverse multiplexed session per defined inverse multiplexed protocol; and
render the content on the wireless device.

13. The wireless client device of claim 12 wherein the LAN comprises a wireless localized ad hoc LAN.

14. The wireless client device of claim 12 wherein the received content comprises a scalable video coded stream.

15. The wireless client device of claim 14 wherein playback of the scalable video coded stream is enabled based on at least one of a plurality of bandwidths received using inverse multiplexing and playback capabilities of each of the other client devices.

16. The wireless client device of claim 15 wherein the playback capabilities of each of the other wireless client devices comprise one or more of a screen size, central processing unit (CPU) power, and battery usage.

17. The wireless client device of claim 14 wherein the received content includes digital rights management (DRM) that allows only authorized client devices access to the scalable video coded stream.

18. The wireless client device of claim 12 wherein a bandwidth of the LAN is greater than a sum of WAN unicast bandwidths.

19. The wireless client device of claim 12 wherein the received content comprises a single high-bandwidth H.264 scalable video format stream.

20. The wireless client device of claim 19 wherein additional H.264 layers may be added or deleted based on additional client devices joining or leaving the inverse multiplexed session.

21. The wireless client device of claim 12 wherein re-transmitting over the LAN uses a Layer-2 Media Access Control (MAC) broadcast to the other client devices.

22. The wireless client device of claim 12 wherein re-transmitting over the LAN uses a Layer-3 route multicast protocol to the other client devices.

23. A method comprising:
establishing a unicast connection with each of a plurality of client devices having a wide area network (WAN) and a local area network (LAN) connectivity;
receiving streaming media content from a content server;
initiating an inverse multiplexed session with each of the plurality of client devices via their respective unicast connections; and
streaming the media content via the inverse multiplexed session over a multi-transport path terminating at each of the client devices to enable each of the client devices to re-transmit the content of its unicast connection over the LAN such that each of the client devices receives the content of the unicast connections of all of the other client devices.

24. A non-transitory computer-readable medium having instructions for directing a processor to perform a method comprising:
establishing a unicast connection with each of a plurality of client devices having a wide area network (WAN) and a local area network (LAN) connectivity;
receiving streaming media content from a content server;
initiating an inverse multiplexed session with each of the plurality of client devices via their respective unicast connections; and
streaming the media content via the inverse multiplex session over a multi-transport path terminating at each of the client devices to enable each of the client devices to re-transmit the content of its unicast connection over the LAN such that each of the client devices receives the content of the unicast connections of all of the other client devices.

* * * * *